United States Patent [19]

Gu

[11] Patent Number: 5,110,220

[45] Date of Patent: May 5, 1992

[54] THRUST BEARING UNDERSPRING

[75] Inventor: Alston L. Gu, Rancho Palos Verdes Estates, Calif.

[73] Assignee: Allied-Signal Inc., Morris Township, Morris County, N.J.

[21] Appl. No.: 667,689

[22] Filed: Mar. 8, 1991

[51] Int. Cl.⁵ .................................. F16C 32/06
[52] U.S. Cl. .................................. 384/105; 384/103; 384/106
[58] Field of Search ................... 384/103–106

[56] References Cited

U.S. PATENT DOCUMENTS

| | | |
|---|---|---|
| 3,378,319 | 9/1965 | Cutting et al. . |
| 3,635,534 | 1/1972 | Barnett ........................... 384/106 |
| 3,747,997 | 7/1973 | Winn . |
| 3,809,443 | 5/1974 | Cherubim . |
| 4,082,375 | 4/1978 | Fortmann . |
| 4,116,503 | 9/1978 | Licht . |
| 4,170,389 | 10/1979 | Eshel . |
| 4,208,076 | 6/1980 | Gray et al. . |
| 4,213,657 | 7/1980 | Gray . |
| 4,225,196 | 9/1980 | Gray . |
| 4,227,753 | 10/1980 | Wilcock . |
| 4,247,155 | 1/1981 | Fortmann . |
| 4,277,111 | 7/1981 | Gray et al. . |
| 4,277,112 | 7/1981 | Heshmat . |
| 4,315,359 | 2/1982 | Gray . |
| 4,383,771 | 5/1983 | Freytag et al. ................ 384/121 |
| 4,462,700 | 7/1984 | Agrawal ........................ 384/105 |
| 4,597,677 | 7/1986 | Hagiwara et al. ............. 384/105 |
| 4,624,583 | 11/1986 | Saville et al. .................. 384/105 |
| 4,682,900 | 7/1987 | Gu ................................. 384/106 X |
| 4,767,221 | 8/1988 | Paletta, deceased et al. ...... 384/105 |

Primary Examiner—Thomas R. Hannon
Attorney, Agent, or Firm—David B. Abel; Terry L. Miller; Robert A. Walsh

[57] ABSTRACT

A foil thrust bearing including a thrust bearing underspring disk having a radially increasing spring force or load capacity. A plurality of spring sections formed in the underspring disk provided improved load capacity and pressure force distribution.

19 Claims, 3 Drawing Sheets

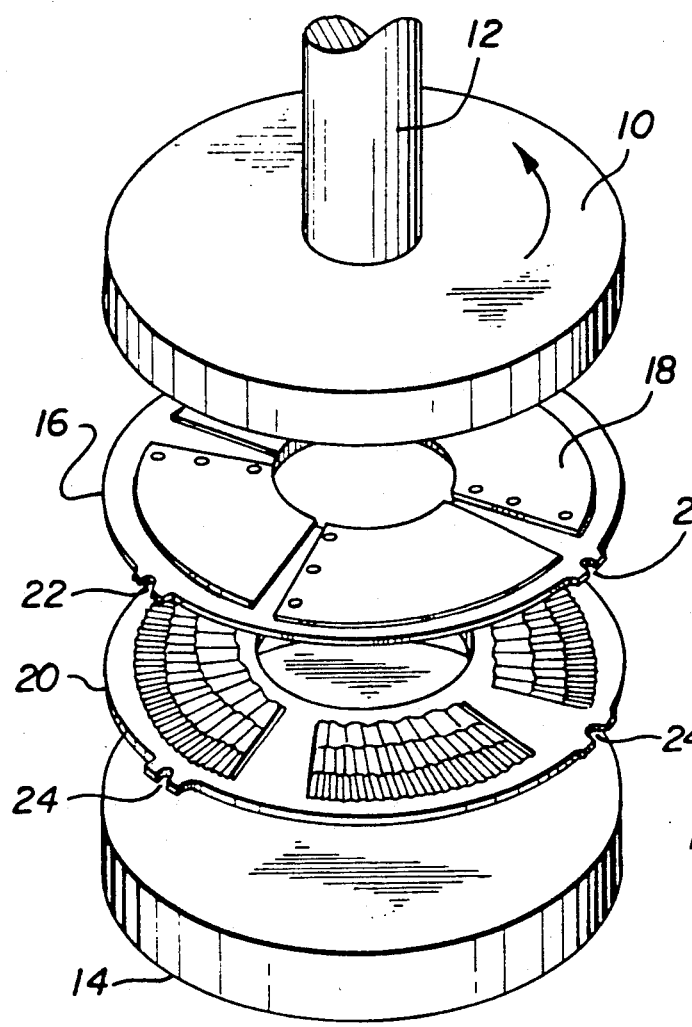
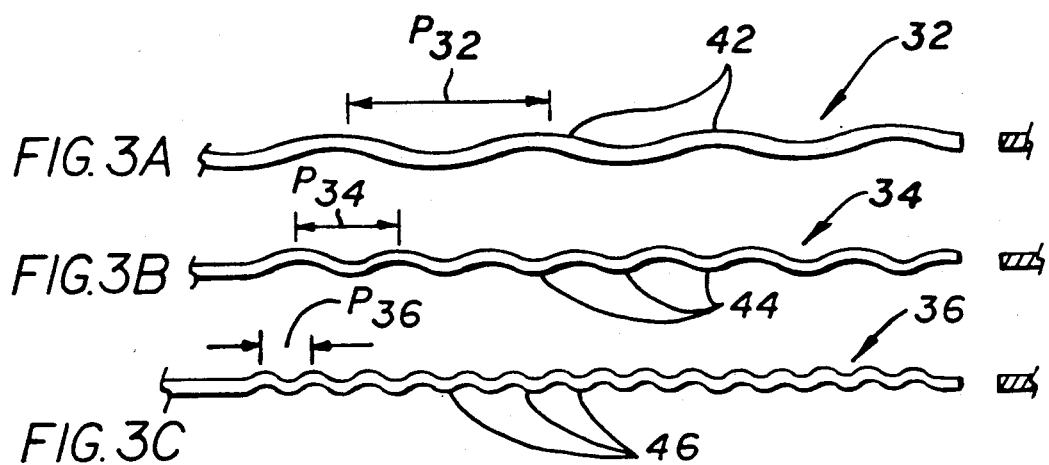

THRUST BEARING UNDERSPRING

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

Improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces. The foils enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability.

In order to properly position the compliant foils between the relatively movable bearing elements, a number of mounting means have been devised. In thrust bearings, it is conventional practice to mount a plurality of individually spaced foils on a foil bearing disk such as by spot welds and position the foil bearing disk on one of the bearing elements as exemplified in U.S. Pat. No. 3,635,534. Alternatively, a compliant unitary foil, such as illustrated in U.S. Pat. No. 4,247,155, has been proposed.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or undersprings beneath the foils to supply this required preload as exemplified in Applicant and Assignee's previous U.S. Pat. Nos. 4,624,583 and 4,682,900. Further examples of current underspring designs are exemplified by U.S. Pat. Nos. 4,082,375; 4,213,657; 4,225,196; 4,247,155; 4,277,111; and 4,277,112. While these references detail underspring designs of various configurations, it is important to note that the associated thrust load capacities is limited to about 40 pounds per square inch (psi). Further, the designs attempt to provide either a radially uniform underspring force, or a radially decreasing underspring force, as discussed in the Grey, U.S. Pat. No. 4,277,111.

SUMMARY OF THE INVENTION

In the present invention, the foil thrust bearing is provided with a thrust bearing underspring disk having a radially increasing spring force or load capacity. A plurality of spring sections formed in the underspring disk provide improved load capacity and pressure force distribution, allowing a maximum thrust load in excess of 80 psi to be attained. In a preferred embodiment, the present underspring disk includes sets of three spring sections spaced apart radially, with the outer spring section having a greater spring force resilience then the radially inner spring sections. For example, the spring sections each include a plurality of corrugations, and the peak to peak length of the corrugations is shorter for the radially outer spring section than for the radially inner spring sections.

BRIEF DESCRIPTION OF THE DRAWINGS

FIG. 1 is an exploded perspective view of a foil thrust bearing of the present invention;

FIGS. 3(a), 3(b), and 3(c) are enlarged cross-sectional views through each of three spring sections of the thrust bearing underspring of FIG. 2 along lines 3—3 thereof;

DESCRIPTION OF THE PREFERRED EMBODIMENTS

Figure 2:
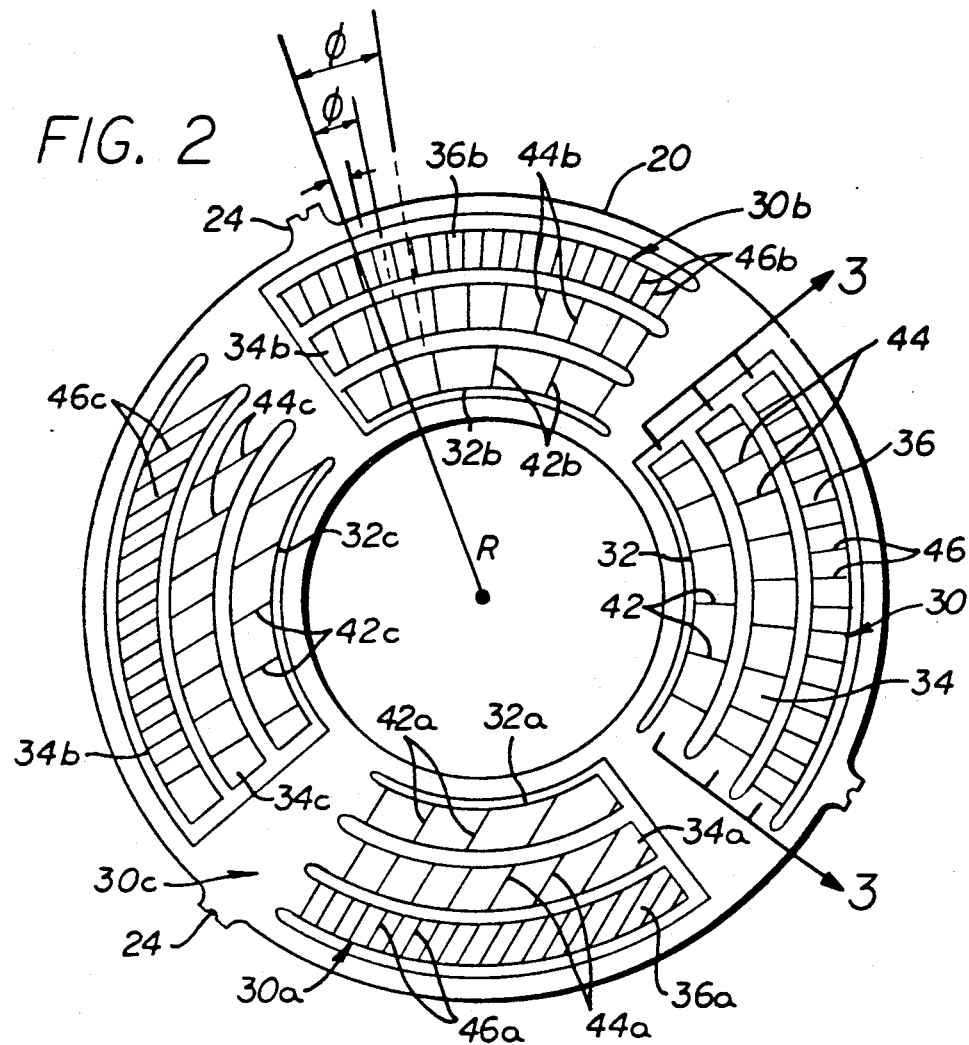
FIG. 2 is an enlarged partial top plan view of the thrust bearing underspring of the foil thrust bearing of FIG. 1.

As illustrated in FIG. 1, a thrust runner 10, including a shaft 12, is rotatably supported on a thrust plate 14 by means of a fluid thrust bearing including a bearing disk 16 and thrust bearing stiffener or foil underspring 20. The bearing disk 16 includes a plurality of compliant foils 18, and the underspring 20 provides radially increasing load support for the compliant foils 18. Individual compliant foils 18 may be mounted on the bearing disk 16 as shown in FIG. 1 by spot welding, or alternatively, the foils may be unitary or integral with the bearing disk 16 as is generally illustrated in U.S. Pat. No. 4,247,155. The bearing disk 16 and underspring 20 may include outer projections 22, 24 respectively, having cutouts which can be utilized to maintain the position of the bearing disk 16 and underspring 20 with respect to the thrust plate 14.

FIG. 2 depicts an enlarged partial top plan view of the underspring 20 of FIG. 1. The underspring 20 includes means for radially increasing the spring force support of the overlying compliant foil 18 (of FIG. 1). The means for radially increasing the spring force of the underspring 20 of FIG. 2 preferably comprises a plurality of sets of spring sections 30, each set of spring sections 30 including at least two and preferably three individual spring elements 32, 34, and 36 (numbered successively with increasing radius). It should be noted that four or more spring elements may be appropriate and indeed preferred for large diameter thrust bearings, however, for clarity only, three spring elements will be depicted and discussed.

The three spring elements 32, 34 36 are preferably individually corrugated 42, 44, 46, and configured to support a single overlying foil 18 of the bearing disk 16 (FIG. 1). Accordingly, the spring elements are arranged radially adjacent one another, extending equal arc angles and thus traversing radially increasing arc lengths. The three spring elements 32, 34, 36 are depicted in a stacked, cross sectional view in FIGS. 3(a)-3(c), wherein the corrugations 42, 44, 46 of each spring element 32, 34, 36 respectively, is apparent. Further, the peak to peak length or pitch ($P_{32}$, $P_{34}$, $P_{36}$), of the corrugations 42, 44, 46 of each spring element 32, 34, 36 is depicted. In order to provide increasing spring force at the radially outer spring elements 34, and 36, the pitch decreases, i.e. $P_{32}$ is greater than $P_{34}$ which in turn is greater than $P_{36}$.

The underspring 20 of FIG. 2 includes four alternative corrugation arrangements for the four spring section sets 30, 30a, 30b, and 30c. In spring section set 30, the corrugations 42, 44, 46 are all radially aligned, thus the pitch of each individual spring element 32, 34, 36 also increases across the radial width of the respective element. Alternatively, the spring section set 30a includes radially uniform, constant pitch corrugations 42a, 44a, 46a. Thus, for spring section set 30a, all of the successive corrugations 42a, 44a, 46a align in parallel with the first corrugation 42a, 44a, 46a, which is proximate the leading edge. Preferably, the first corrugation 42a, 44a, 46a is radially aligned. A third possible configuration is depicted in spring section set 30b, wherein all of the corrugations 42b, 44b, 46b are set at an angle $\phi$ with respect to a radius. It should be noted that the angle $\phi$ is not necessarily the same for the respective spring elements 32b, 34b, 36b. A fourth possible configuration is depicted in spring section set 30c, wherein all of the corrugations 42c, 44c, 46c are align in parallel with the last corrugation 42c, 44c, 46c, which is proximate the trailing edge of the spring elements 32c, 34c, 36c. Preferably, this last corrugation 42c, 44c, 46c is radially aligned.

Figure 4A:
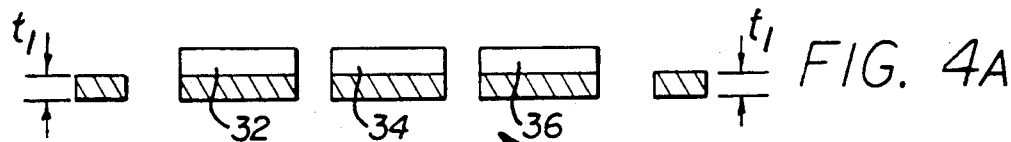
FIGS. 4A and 4B are alternative cross-sectional views of the thrust bearing underspring of FIG. 2 taken along a radius thereof.
Figure 4B:
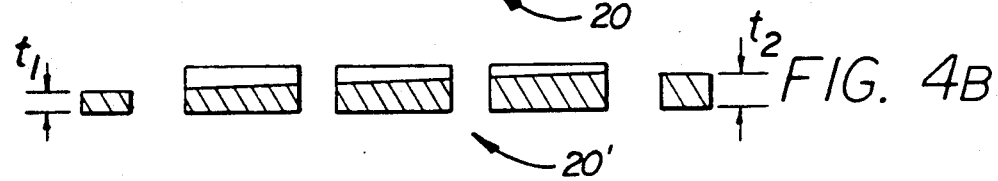

FIGS. 4A and 4B show alternative cross sections through the underspring 20. As depicted, the underspring 20 comprises a thin compliant ring disk having a thickness (t) generally between 0.0025 centimeters (cm.) and 0.075 cm. The cross sectional thickness, $t_1$ of the underspring 20 may be uniform as shown in FIG. 4A. Alternatively, as shown in FIG. 4B, an underspring 20' having a varying cross sectional thickness which increase radially, from $t_1$ to $t_2$, may be configured as shown in FIG. 2. Increasing the cross sectional thickness further increases the spring force of the underspring 20' with increasing radius.

Figure 5:
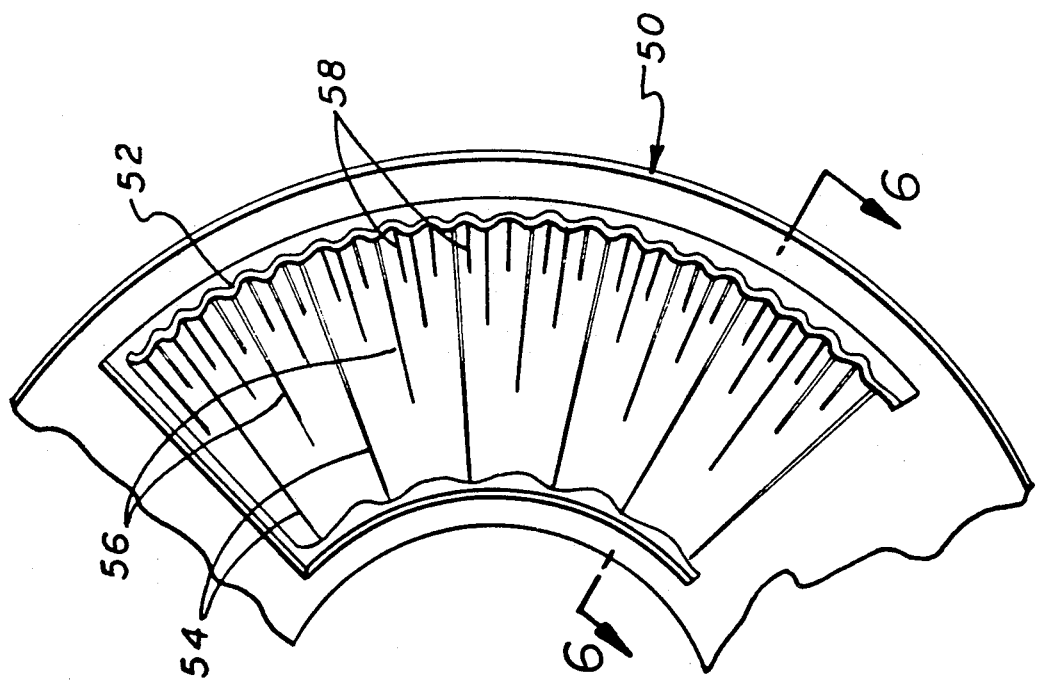
FIG. 5 is an enlarged partial perspective view of an alternate thrust bearing underspring of the present invention.

FIG. 5 is an enlarged partial perspective view of an alternate thrust bearing underspring 50. The means for radially increasing the spring force of the underspring 50 of FIG. 5 comprises a spring element 52 including a first plurality of generally radially aligned ridges 54 which extend across the entire radial width of the spring element 52, and a set of second ridges 56 generally radially aligned and extending inward from the radially outer edge 58 of the spring element a fractional portion of the radial width of the spring element 52. In the spring element 52, the first and second sets of ridges 54, 56 are alternately spaced and have equal heights.

Depending on the radial width of the underspring 50, the spring element 52 may further include a third set of ridges 58 extending radially inward a fractional portion of the width of the spring element 52. Preferably, the third set of ridges 58 are located between each of the first and second set of ridges 54, 56. In addition, the second set of ridges 56 preferably extend radially inward approximately two-thirds of the width of the spring element 52 and the third set of ridges 58 extend approximately one-third of the width of the spring element 52. Those skilled in the art will appreciate that for large diameter undersprings additional sets of ridges may be required.

Figure 6A:
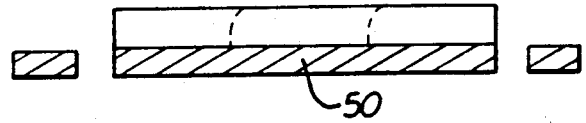
FIGS. 6A and 6B are alternative cross-sectional views of the thrust bearing underspring of FIG. 5 taken along line 6—6 thereof.
Figure 6B:
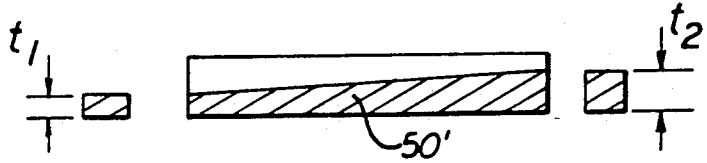

FIGS. 6A and 6B show alternative cross sections through the underspring 50 of FIG. 5. Underspring 50 comprises a thin compliant ring disk having a thickness (t) generally between 0.0025 centimeters (cm.) and 0.075 cm. The cross sectional thickness, $t_1$ of the underspring 50 may be uniform as shown in FIG. 6A, alternatively, the cross sectional thickness of an underspring 50' may increase radially, from $t_1$ to $t_2$, as shown in FIG. 6B, wherein $t_1$ is in the range of between 0.0025 cm. and 0.075 cm. and $t_2$ is in the range of between $t_1$ and sum of $t_1 + 0.075$ cm. Increasing the cross sectional thickness further increases the spring force of the underspring 50' with increasing radius.

Figure 7:
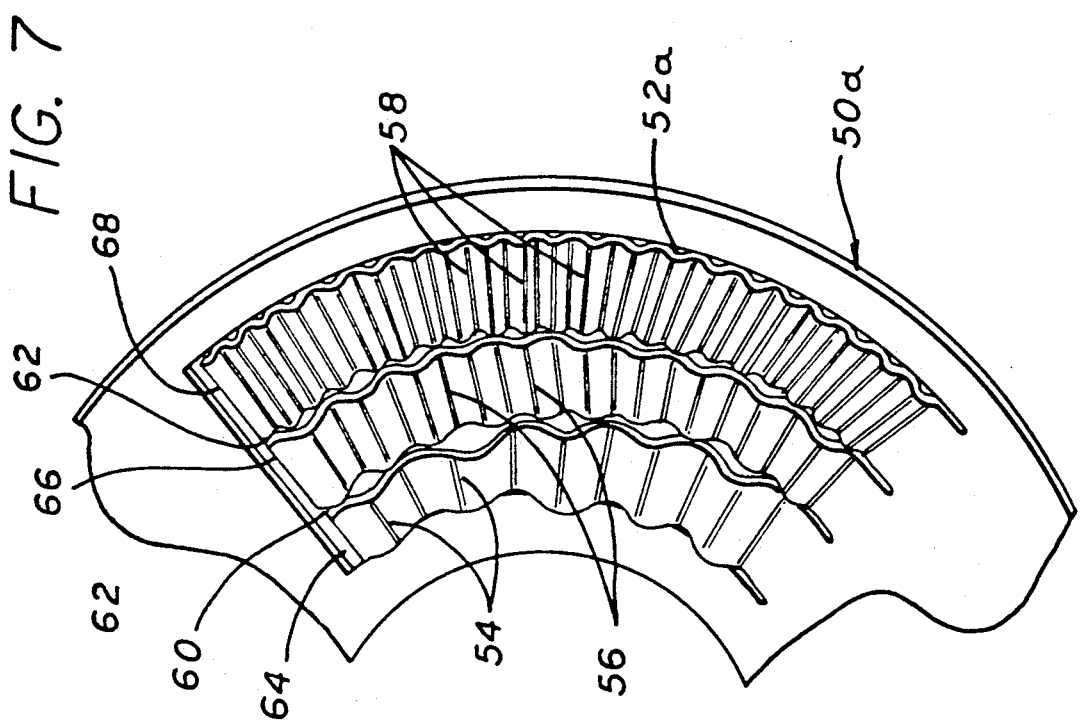
FIG. 7 is an enlarged partial perspective view of another alternate thrust bearing underspring of the present invention.

FIG. 7 shows an alternative configuration for an underspring 50a similar to the underspring 50 of FIG. 5, including in addition at least one and preferably two slits 60, 62 in the spring elements 52a of the underspring 50a. The slits 60, 62 are preferably arcuate in shape, and divide the spring elements 52a into two or three segments 64, 66, 68. The slits 60, 62 are preferably located at the radially inner ends of the second and third sets of ridges 56, 58 respectively. Thus, the radially inner segment 64 includes one set of ridges, the middle segment 66 includes two sets of ridges, and the outer segment 68 includes three sets of ridges. The underspring 50a of FIG. 7 can have either of the cross sections shown in FIG. 6A or 6B. Furthermore, the undersprings 50, 50a can have any of the orientations for the corrugations depicted in FIG. 2 and described above.

Under the dynamic conditions depicted in FIG. 1, the bearing disk 16 and underspring 20 (or 50, 50a) support the thrust runner 10 on a cushion of air or pressurized fluid. For sector shaped compliant foils 18, fluid film pressure increases radially to a maximum at the outer diameter due to the radial velocity gradient. In addition, the pressure between the relatively rotating thrust runner 10 and bearing disk 16 is dependent upon the relative velocity. Thus, higher pressures are generated at the radially outer portions of the bearing disk 16 then at the inner portions. The undersprings 20 of the present invention are designed to provide radially increasing stiffness to achieve uniform deflection and thus constant film thickness across the radial width of the foils 18. This in turn allows higher total bearing load capacities for the foil thrust bearings of the present invention.

The undersprings 20, 50, or 50a are preferably formed by either a chemical etching or stamping operation, wherein the cutouts and slits defining the spring elements 32, 34, 36, 52, or 52a are made first and the corrugations 42, 44, 46 or ridges 54, 56, 58 are subsequently etched or stamped. Alternatively, the individual spring elements 32, 34, 36, 52, or 52a can be cut out of sheets, corrugated (or ribbed), and then attached to a metallic disk which includes the appropriately configured cutouts to accommodate the individual spring elements 32, 34, 36, 52, or 52a.

While specific embodiments of the invention have been illustrated and described, it is understood that these are provided by way of example only. While the invention is shown as a thrust bearing, it should be readily apparent that it is equally applicable to a conical bearing that has a thrust component. Thus, the invention is to be construed as being limited only by the proper scope of the following claims.

I claim:

1. A fluid thrust bearing comprising:
   a thrust runner;
   a thrust plate to rotatably support said thrust runner; and
   a complaint foil bearing operably disposed between said thrust runner and said thrust plate, said compliant foil bearing including a bearing disk having a plurality of compliant foils disposed towards said thrust runner and a foil underspring disposed between said thrust plate and said bearing disk, said underspring including means for providing radially outwardly increasing spring force support of said overlying compliant foils.

2. The fluid thrust bearing of claim 1, wherein said means for radially increasing the spring force of the underspring comprises:
   a plurality of sets of spring sections, each of said spring sections including at least two individual spring elements, said spring elements individually corrugated and said spring sections each configured to support one of said overlying foils of said bearing disk.

3. The fluid thrust bearing of claim 2 wherein said spring elements of one spring section are arranged radially adjacent one another, extending equal arc angles and traversing radially increasing arc lengths.

4. A fluid thrust bearing comprising:
   a thrust runner;
   a thrust plate to rotatably support said thrust runner; and
   a compliant foil bearing operably disposed between said thrust runner and said thrust plate, said compliant foil bearing including a bearing disk having a plurality of compliant foils disposed towards said thrust runner and a foil underspring disposed between said thrust plate and said bearing disk, said underspring including means for providing radially increasing spring force support of said overlying compliant foils;
   wherein said means for radially increasing the spring force of the underspring comprises: a plurality of sets of spring sections, each of said spring sections including at least two individual spring elements, said spring elements individually corrugated and said spring sections each configured to support one of said overlying foils of said bearing disk;
   wherein said spring elements of one spring section are arranged radially adjacent one another, extending equal arc angles and traversing radially increasing arc lengths;
   wherein said corrugations of said spring elements have a peak to peak pitch P, and said pitch P of a radially outer spring element is less then the corresponding pitch P for any respective radially inner spring element.

5. The fluid thrust bearing of claim 4 wherein said corrugations of said spring elements are all radially aligned, whereby the corrugation pitch of each of said individual spring elements increases across the radial width of the respective spring element.

6. The fluid thrust bearing of claim 4 wherein said corrugations of said spring elements are all radially uniform, having a constant pitch, whereby all corrugations align in parallel with a selected one of said corrugations.

7. The fluid thrust bearing of claim 6 wherein said first corrugation of said spring elements is radially aligned.

8. The fluid thrust bearing of claim 6 wherein said corrugations of said spring elements are set at an angle with respect to a radius.

9. The fluid thrust bearing of claim 6 wherein said corrugations of said spring elements are set at an angle with respect to a radius, said angle $\phi$ having a different value for each of said respective spring elements.

10. The fluid thrust bearing of claim 4, wherein said means for radially increasing the spring force comprises:
    a thin compliant ring disk underspring having a cross sectional thickness $t_1$ at a radially inner edge and $t_2$ at a radially outer edge, wherein $t_1$ is in the range of between 0.0025 cm. and 0.075 cm, and $t_2$ is in the range of between $t_1$ and the sum of $t_1 + 0.075$ cm.

11. The fluid thrust bearing of claim 4, wherein said underspring further comprises:
    a thin compliant ring disk having a uniform thickness the range of between 0.0025 cm. and 0.075 cm.

12. The fluid thrust bearing of claim 4, wherein said underspring further comprises:
    a thin compliant ring disk having a cross sectional thickness $t_1$ at a radially inner edge and $t_2$ at a radially outer edge, wherein $t_1$ is in the range of between 0.0025 cm. and 0.075 cm, and $t_2$ is in the range of between $t_1$ and the sum of $t_1 + 0.075$ cm.

13. A fluid thrust bearing comprising:
    a thrust runner;
    a thrust plate to rotatably support said thrust runner; and
    a compliant foil bearing operably disposed between said thrust runner and said thrust plate, said compliant foil bearing including a bearing disk having a plurality of compliant foils disposed towards said thrust runner and a foil underspring disposed between said thrust plate and said bearing disk, said underspring including means for providing radially increasing spring force support of said overlying compliant foils;
    wherein said means for radially increasing the spring force of the underspring comprises:
    a spring element including a first plurality of generally radially aligned ridges which extend across the entire radial width of said spring element, and a set of second ridges generally radially aligned and extending inward from a radially outer edge of said spring element a fractional portion of the radial width of said spring element (52), said first and second sets of ridges (54, 56) alternately spaced and equal in height.

14. The fluid thrust bearing of claim 13, wherein said spring element further comprises:
    a third set of ridges extending radially inward a fractional portion of the width of said spring element, said third set of ridges located between each of said first and second set of ridges.

15. The fluid thrust bearing of claim 14, wherein said second set of ridges extend radially inward approximately two-thirds of the width of said spring element and said third set of ridges extend approximately one-third of the width of said spring element.

16. The fluid thrust bearing of claim 14, wherein said spring elements further include two slits, said slits arcuate in shape and dividing said spring elements into three segments, said slits located at the radially inner ends of said second and third sets of ridges.

17. The fluid thrust bearing of claim 13, wherein said spring elements further include at least one slit, said slit dividing said spring elements at least two segments.

18. The fluid thrust bearing of claim 13, wherein said underspring further comprises:
a thin compliant ring disk having a uniform thickness in the range of between 0.0025 cm. and 0.075 cm.

19. The fluid thrust bearing of claim 13, wherein said underspring further comprises:
a thin compliant ring disk having a cross sectional thickness $t_1$ at a radially inner edge and $t_2$ at a radially outer edge, wherein $t_1$ is in the range of between 0.0025 cm. and 0.075 cm, and $t_2$ is in the range of between $t_1$ and the sum of $t_1 + 0.075$ cm.

* * * * *